United States Patent
Jacquot et al.

(10) Patent No.: US 8,266,616 B1
(45) Date of Patent: Sep. 11, 2012

(54) COMPUTER SYSTEM PROVISIONING USING TEMPLATES

(75) Inventors: Bryan J. Jacquot, Ft. Collins, CO (US); Paul D. Grubb, Ft. Collins, CO (US); Kurt M. Olender, Ft. Collins, CO (US); Roy Johnson, Ft. Collins, CO (US); John Liddell Long, Ft. Collins, CO (US); Michael Kingdom, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1426 days.

(21) Appl. No.: 11/433,663

(22) Filed: May 11, 2006

(51) Int. Cl.
G06F 9/44 (2006.01)
G06F 9/445 (2006.01)

(52) U.S. Cl. .......................... 717/177; 717/121; 717/174

(58) Field of Classification Search .................. None
See application file for complete search history.

(56) References Cited

U.S. PATENT DOCUMENTS

| | | | |
|---|---|---|---|
| 6,247,109 B1 * | 6/2001 | Kleinsorge et al. | 712/13 |
| 6,345,287 B1 * | 2/2002 | Fong et al. | 718/102 |
| 6,606,744 B1 * | 8/2003 | Mikurak | 717/174 |
| 6,854,016 B1 * | 2/2005 | Kraenzel et al. | 717/177 |
| 7,007,276 B1 * | 2/2006 | Kubala et al. | 718/104 |
| 7,054,924 B1 * | 5/2006 | Harvey et al. | 709/220 |
| 7,292,969 B1 * | 11/2007 | Aharoni et al. | 703/21 |
| 7,310,673 B2 * | 12/2007 | Zhu et al. | 709/226 |
| 7,350,186 B2 * | 3/2008 | Coleman et al. | 717/103 |
| 7,406,477 B2 * | 7/2008 | Farrar et al. | 707/102 |
| 7,496,890 B2 * | 2/2009 | Miller et al. | 717/121 |
| 7,603,443 B2 * | 10/2009 | Fong et al. | 709/220 |
| 7,644,162 B1 * | 1/2010 | Zhu et al. | 709/226 |
| 7,676,552 B2 * | 3/2010 | Eilam et al. | 709/218 |
| 7,694,117 B2 * | 4/2010 | Kilian et al. | 713/1 |
| 7,694,303 B2 * | 4/2010 | Hahn et al. | 718/104 |
| 7,703,092 B1 * | 4/2010 | Glaser et al. | 717/177 |
| 7,743,373 B2 * | 6/2010 | Avram et al. | 717/174 |
| 7,779,389 B2 * | 8/2010 | Markov et al. | 717/121 |
| 7,810,094 B1 * | 10/2010 | McClure et al. | 718/102 |
| 7,890,951 B2 * | 2/2011 | Vinberg et al. | 717/174 |
| 7,970,905 B2 * | 6/2011 | Baskaran et al. | 709/226 |
| 8,108,855 B2 * | 1/2012 | Dias et al. | 717/177 |
| 8,151,245 B2 * | 4/2012 | Oberlin et al. | 717/121 |
| 8,156,477 B2 * | 4/2012 | Rozenfeld | 717/174 |
| 2003/0221094 A1 * | 11/2003 | Pennarun | 713/1 |
| 2004/0078373 A1 | 4/2004 | Ghoneimy et al. | |
| 2005/0177716 A1 | 8/2005 | Ginter et al. | |
| 2005/0192921 A1 | 9/2005 | Chaudhuri et al. | |
| 2006/0010450 A1 * | 1/2006 | Culter | 718/104 |
| 2006/0020937 A1 * | 1/2006 | Schaefer | 717/174 |

(Continued)

OTHER PUBLICATIONS

A D.H. Brown Associates, Inc. "HP raises the Bar for UNIX Workload Management", 2005; [retrieved on Sep. 1, 2011]; Retrieved from Internet <URL:http://www.s7.com/pdfs/hp.rases.bar.wkld.mgmt.pdf>; pp. 1-16.*

(Continued)

Primary Examiner — Thuy Dao
Assistant Examiner — Xi D Chen

(57) ABSTRACT

A method of computer system provisioning comprises defining a container as a plurality of computer system resources sufficient to run a workload, defining a workload as a set of processes executable on the container and monitored as a single entity, and modeling the container and/or the workload as a template that contains at least some of information for deploying the container and/or the workload.

11 Claims, 18 Drawing Sheets

U.S. PATENT DOCUMENTS

| | | | |
|---|---|---|---|
| 2006/0025985 | A1 | 2/2006 | Vinberg et al. |
| 2006/0059253 | A1 | 3/2006 | Goodman et al. |
| 2006/0250981 | A1* | 11/2006 | Li et al. .......................... 370/254 |
| 2007/0157172 | A1* | 7/2007 | Zenz et al. .................... 717/121 |
| 2007/0256073 | A1* | 11/2007 | Troung et al. ..................... 718/1 |
| 2008/0256531 | A1* | 10/2008 | Gao et al. ...................... 717/177 |
| 2009/0144700 | A1* | 6/2009 | Huff et al. ..................... 717/121 |
| 2009/0265712 | A1* | 10/2009 | Herington ...................... 718/103 |
| 2010/0107163 | A1* | 4/2010 | Lee ................................ 717/177 |
| 2011/0265064 | A1* | 10/2011 | Hadar et al. .................. 717/121 |

OTHER PUBLICATIONS

Hewlett-Packard Development Company, L.P. "HP Process Resource Manager overview", [retrieved on Sep. 1, 2011]; Retrieved from Internet <URL:http://h71028.www7.hp.com/.../5982-4359EN-Process-Resource-Manger.pdf>; pp. 1-18.*

Wang, et al., "Utilization and SLO-Based Control for Dynamic Sizing of Resource Partitions", IFIP iInternational Federation for INformaiton Processing 2005; [retrieved on Sep. 1, 2011]; Retrieved from Internet <URL:http://www.springerlink.com/content/a349jrj4l fwdxv7f/fulltext.pdf>; pp. 133-144.*

Liu, et al., "Adaptive Entitlement Control of Resource Containers on Shared Servers", 2005 IEEE; [retrieved on Sep. 6, 2011]; Retrieved from Internet <URL:http://ieeexplore.ieee.org/stamp/stamp.jsp?tp=&arnumber=1440783>; pp. 163-175.*

Groupner, et al., "Resource-Sharing and Service Deploymnet in Virtual Data Centers", 2002, IEEE; [retrieved on May 25, 2012]; Retrieved from Internet <URL: http://ieeexplore.ieee.org/stamp/stamp.jsp?tp=&arnumber=1030845>;pp. 1-6.*

Steinder, et al., "Server virtualization in autonomic management of heterogeneous workloads", 2007, IEEE; [retrieved on May 25, 2012]; Retrieved from Internet <URL: http://ieeexplore.ieee.org/stamp/stamp.jsp?tp=&arnumber=4258530>;pp. 139-148.*

Kumr, et al., "vManage: Loosely Coupled Platform and Virtualization Management in Data Centers", 2009, ACM; [retrieved on May 25, 2012]; Retrieved from Internet <URL: http://dl.acm.org/ft_gateway.cfm?id=1555262>;pp. 127-136.*

Vasic, et al., "DejaVu: Accelerating Resource Allocation in Virtualized Environments", 2012, ACM; [retrieved on May 25, 2012]; Retrieved from Internet <URL: http://dl.acm.org/ft_gateway.cfm?id=2151021 >;pp. 423-435.*

* cited by examiner

COMPUTER SYSTEM PROVISIONING USING TEMPLATES

BACKGROUND

Deploying and updating software are often tedious and time-consuming tasks for users and system administrators. Procedures and tools are sought for quickly and efficiently deploying, replicating, updating, and managing system structures and software for many systems. Suitable tools can also be useful for reprovisioning systems whereby a hardware resource subject to failure can be reprovisioned using the tools to replace failed hardware from a free resource pool. A capability to perform rolling system upgrades may also be sought whereby a large number of systems are supplied with software upgrades, managed, and scheduled for initialization or reboot at a specified time or in a controlled sequence, enabling a predictable transition to upgraded software.

Conventional techniques in the process of automated system creation entail either manually repeating a set of disparate steps or scripting command line invocations. The process of repeating steps can be faulty due to the inefficiency and susceptibility to error inherent in reentry of identical fields. Usage of command line invocations, often the scripting can be too restrictive and does not offer a sufficiently wide range of configuration values. Furthermore, user or system manager imposed scripting implementations can be difficult to maintain and have to be created for each unique circumstance.

Some tools automate individual parts of the overall configuration, but do not allow provisioning of an entire hierarchical setup.

SUMMARY

An embodiment of a method for computer system provisioning comprises defining a container as a plurality of computer system resources sufficient to run a workload, defining a workload as a set of processes executable on the container and monitored as a single entity, and modeling the container and/or the workload as a template that contains at least some of information for deploying the container and/or the workload.

BRIEF DESCRIPTION OF THE DRAWINGS

Embodiments of the invention relating to both structure and method of operation may best be understood by referring to the following description and accompanying drawings.

DETAILED DESCRIPTION

Users such as system administrators often desire to create many systems with identical or similar specifications. System creation is typically highly manual and can be tedious due to the repetition of individually creating multiple aspects of the system.

A template constructor permits automatic deployment of systems while retaining sufficient flexibility to permit a wide range of generic configuration values. The template constructor enables flexibility to define a range of valid parameters, streamlining creation of systems that are not identical but which share a subset of configuration values.

The template constructor enables provisioning of an entire hierarchical configuration of a system. The template constructor can be implemented as a composite template. For example, a composite template can be configured to create a complex including fixed partitions (nPartitions) which contain virtual partitions (vPartitions), further containing resource partitions.

A "container" defines computer system resources allocated to run a "workload". Containers, once deployed, can run an operating system. Examples of containers include stand-alone servers and workstations, fixed partitions (nPartitions or nPars), virtual partitions (vPartitions or vPars), and Virtual Machines (VMs).

A "workload" defines a set of processes that can be run on a container and monitored as a single entity. The processes can be defined by a list of executable names, by the user who initiates a process, by the process that initiates other processes, by process group identifier (ID), and the like. For example, processes initiated by a user can be identified as processes started by user "wluser". Similarly, processes initiated by a spawning process can be identified according to an identifier (ID) of the spawning process.

A "template" functions as a model of either a container or a workload. A template contains some or all of the information for actually deploying a modeled container or workload. Templates can be persisted to supply a basis for creating and deploying new containers and workloads based on the stored definitions. Templates can also take other templates as attributes, enabling creation and deployment of composite templates. A template composed of other templates greatly simplifies deployment of entire systems, for example including a multitude of technologies and operating systems.

Figure 1:
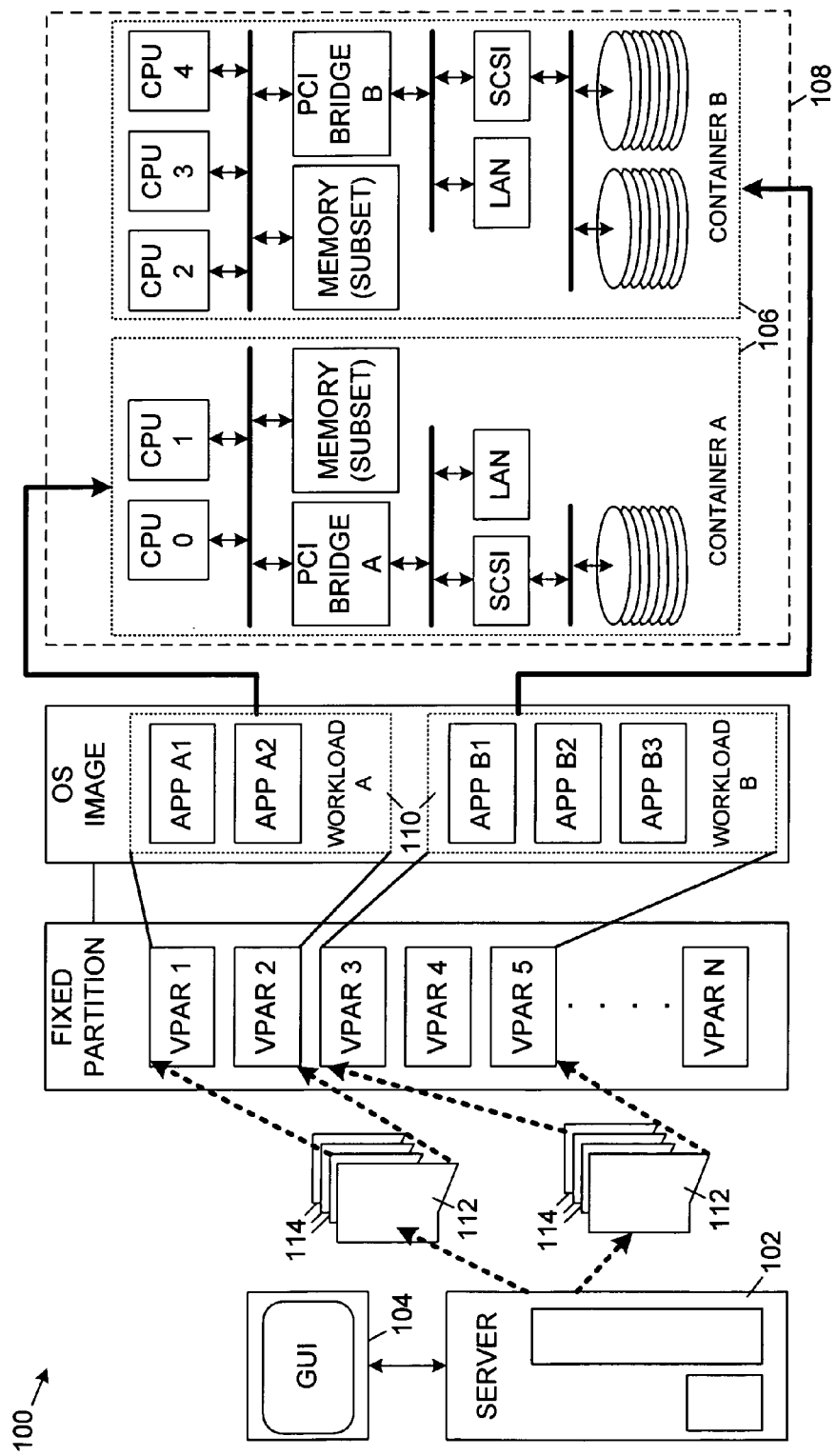
FIG. 1 is a schematic block diagram illustrating an embodiment of a computer system which is adapted for provisioning via usage of templates.

Referring to FIG. 1, a schematic block diagram illustrates an embodiment of a computer system 100 which is adapted for provisioning via usage of templates. The illustrative computer system 100 comprises a programmable computer 102 and a graphical user interface (GUI) 104 that is executable on the programmable computer 102. The graphical user interface 104 provisions the computer system 100 under user control.

In an illustrative application, the graphical user interface 104 enables the user to define a container 106 as a plurality of computer system resources 108 sufficient to run a workload 110 and to define the workload 110 as a set of processes executable on the container 106 and monitored as a single entity. The graphical user interface 104 further enables the user to model the container 106 and/or the workload 110 as a workload template 112 that describes the computer system 100 and contains at least some information for deploying the container 106 and/or the workload 110. The workload template 112 can contain a composite of additional templates 114.

To maintain templates, one graphical user interface (GUI) implementation can add a single pane to the workspace. The pane can contain both a list of existing templates as well as a constructor link to create new templates. A creation wizard enables a user to specify ranges of values which apply for a specific instance of the workload or template. A template, once created, can be applied to an unconfigured system, for example by the technique of drag-and-drop, which triggers system deployment. If any configuration parameters are too vague to permit system deployment, the user can be prompted to enter a more specific value. Otherwise, deployment may be entirely automatic.

Figure 2A:
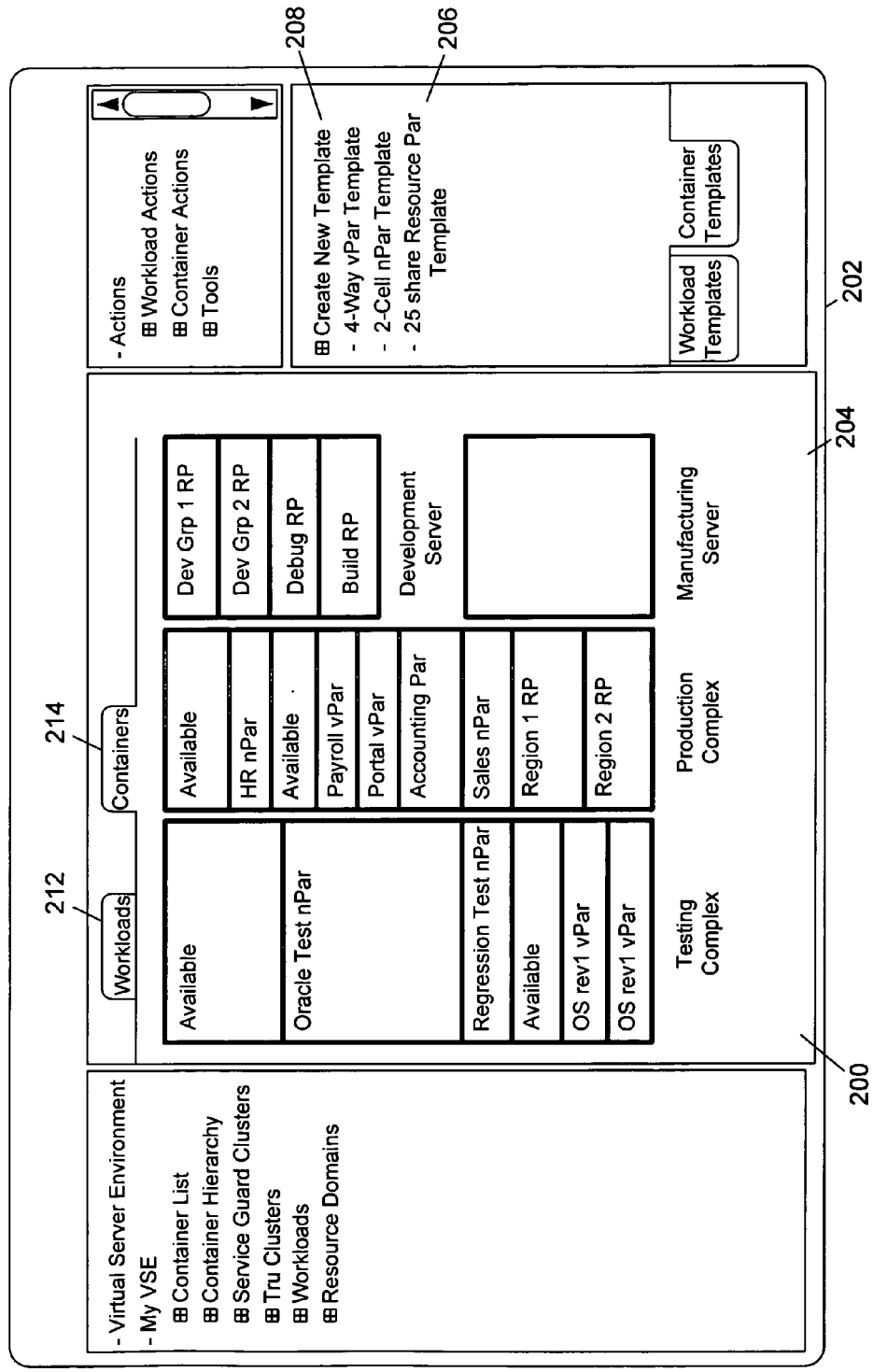
FIGS. 2A through 2E are a schematic screen shots that depict embodiments of screen displays that can be generated by a computer system via the graphical user interface.

Referring to FIG. 2A, a schematic screen shot depicts an embodiment of a screen display 200 that can be generated by a computer system via the graphical user interface. The graphical user interface can be further adapted to display a single pane 202 in a workspace 204 containing a list of existing templates 206 and a constructor link 208 that enables creation of new templates.

In some embodiments, the graphical user interface can further comprise a creation wizard 210 (shown in FIG. 2B) which is adapted to enable the user to specify ranges of values applicable to a specific instance of a workload and/or template 206.

The graphical user interface can be implemented to enable one-click provisioning via templates. Users can define parameters for a specific class of workload 212 or container 214 and use the template to automatically deploy systems which match the template specifications. For sufficiently defined parameters, the template can be applied to a system and have the system deployed in a single action, such as a click of a button.

Figure 2B:
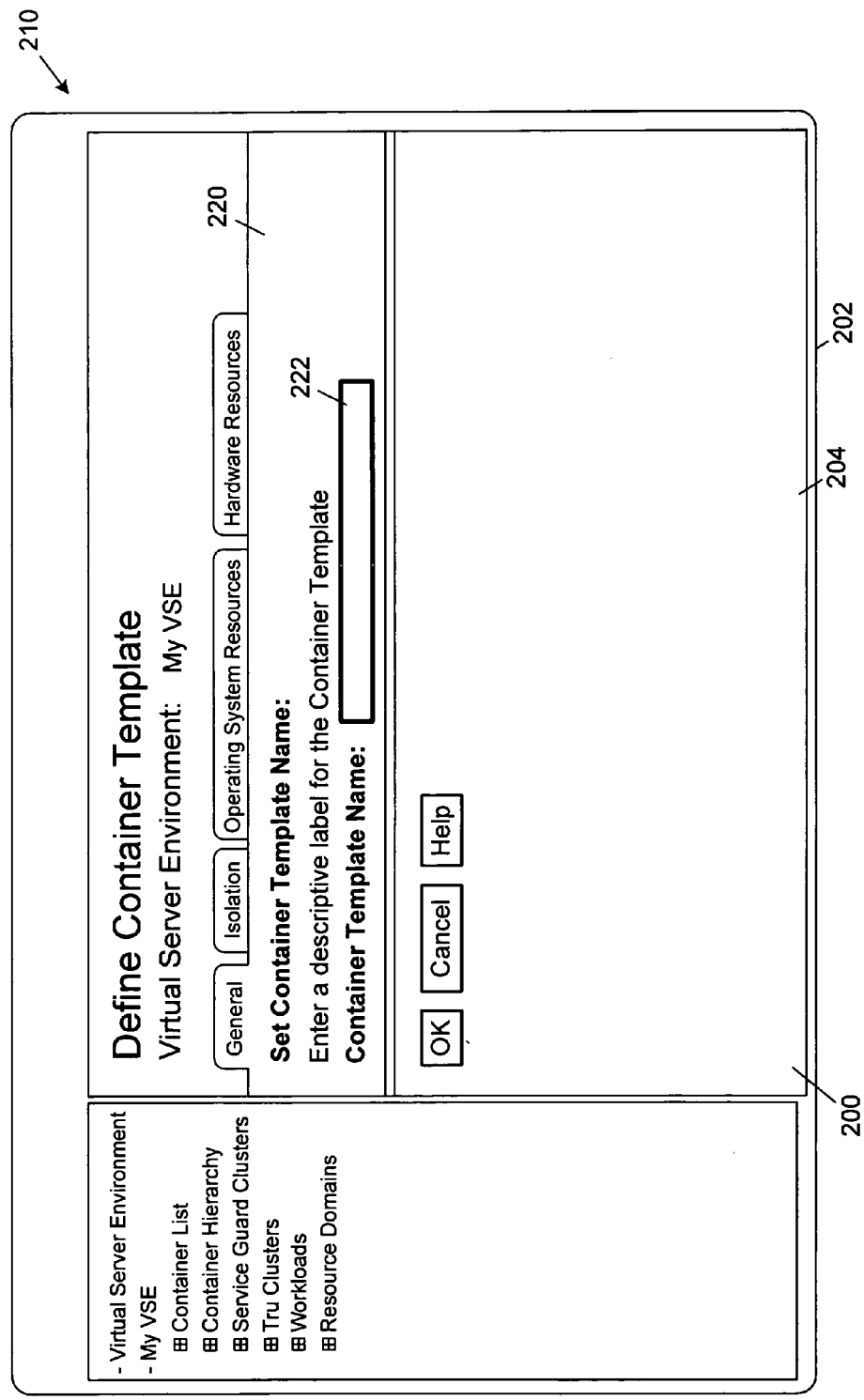

FIG. 2B illustrates a screen shot of a screen for defining a container template and setting general parameters. The general screen 220 includes a field 222 for entering the name of the container template.

Figure 2C:
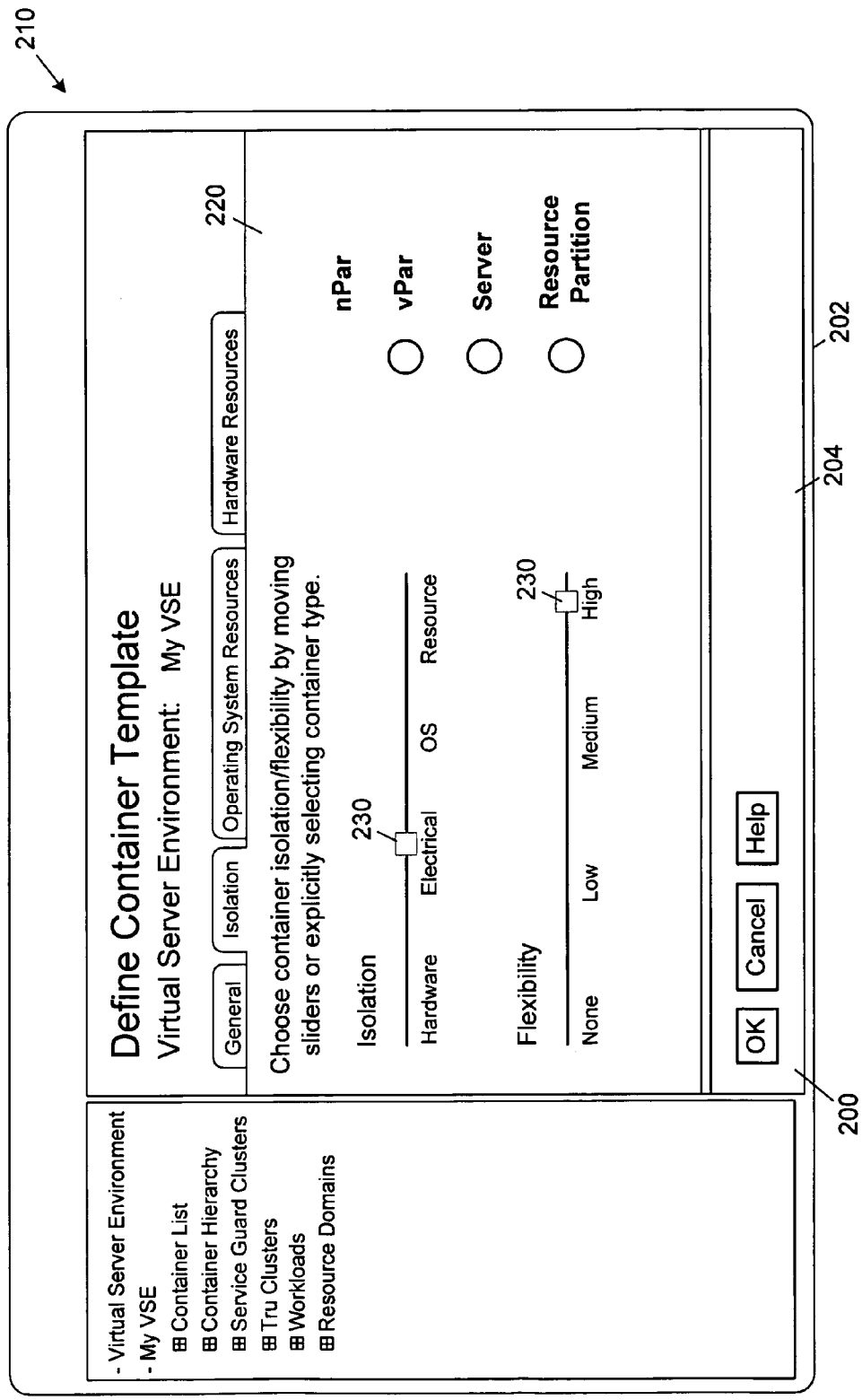

FIG. 2C illustrates a screen shot of a screen for setting isolation parameters for a container template. Container isolation and flexibility can be selected by moving sliders 230 or explicitly selecting a container type, for example among a fixed partition (nPar), virtual partition (vPar), server, or resource partition container type. When a specific container type is selected, the appropriate isolation and flexibility characteristics are automatically represented on the sliders 230.

Figure 2D:
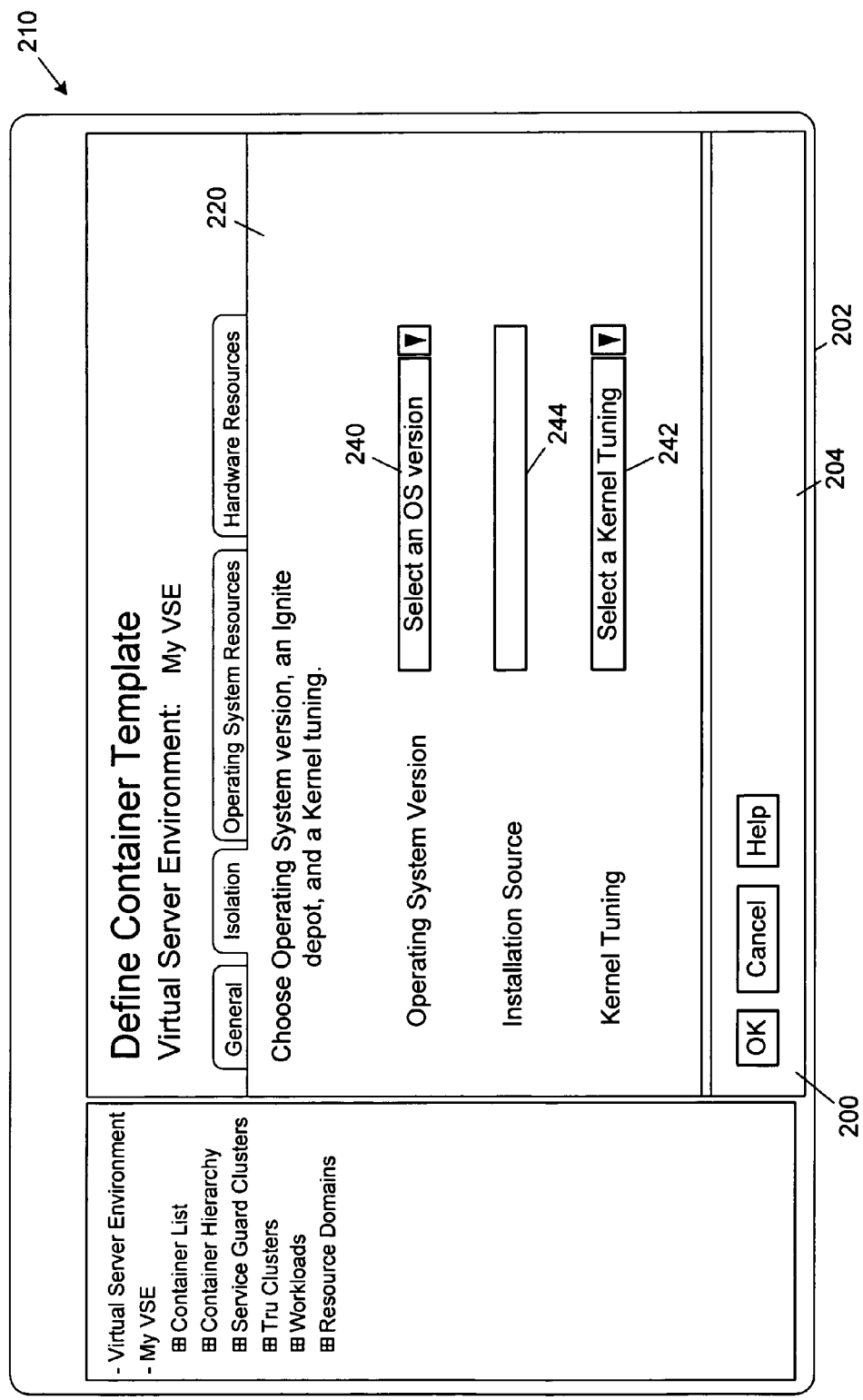

FIG. 2D shows a screen shot of a screen for selecting operating system resources. The operating system running on the resource can be selected 240, for example from among choices including HP-UX, Linux, Windows, and the like, along with the operating system version. The illustrative screen also enables selection of kernel tuning 242 and installation source 244.

Figure 2E:
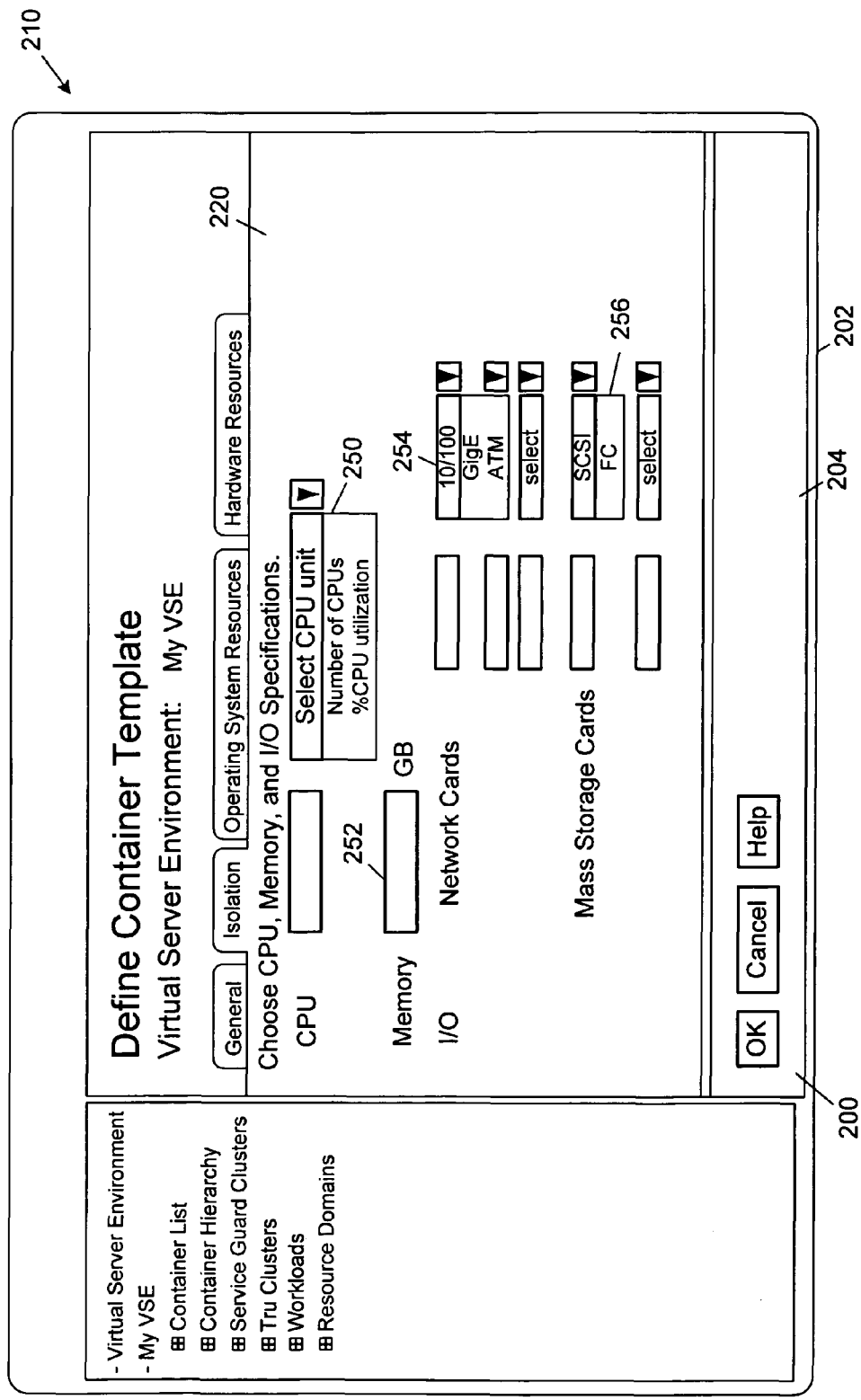

FIG. 2E shows a screen shot of a screen for selecting hardware resources including central processing units (CPUs) 250, memory size 252, and selection of input/output (I/O) resources such as network cards 254 and mass storage cards 256.

Referring to FIGS. 3A through 3H, several schematic flow charts illustrate various embodiments and aspects of embodiments of a method for provisioning a computer system using templates.

Figure 3A:
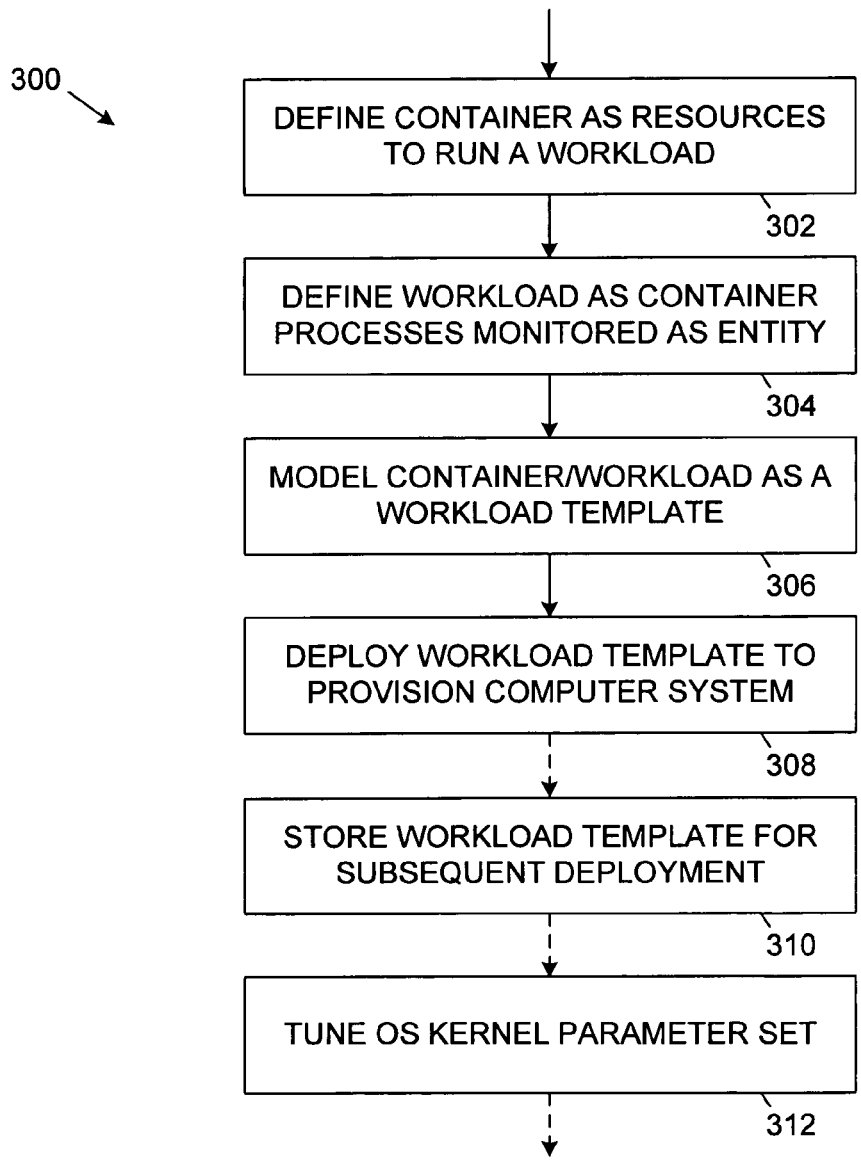
FIGS. 3A through 3H are schematic flow charts illustrating various embodiments and aspects of embodiments of a method for provisioning a computer system using templates.

Referring to FIG. 3A, a flow chart depicts an embodiment of a computer system provisioning method 300 comprising defining 302 a container as computer system resources which are sufficient to run a workload. A workload can be defined 304 as a set of processes executable on the container and monitored as a single entity. The container and/or the workload can be modeled 306 as a workload template that describes the computer system and contains at least some information for deploying the container and/or the workload. The workload template can be configured to contain a composite of additional templates. Typically, the workload template is deployed 308 to provision the computer system. The workload template can also be stored 310 for additional deployment to enable identical or similar deployment in the same computer system or in other computer systems. In some applications, a user can also simply store the workload template without deployment.

In some example embodiments, the container can be selected from various computer system resource types such as stand-alone servers and workstations, hard partitions (nPartitions or nPars), virtual partitions (vPartitions or vPars), Virtual Machines (VMs), and resource partitions. Workloads may be defined as processes owned by a user, processes owned by a set of users, instances of a defined set of executables, customized mappings of processes to workloads performed by hard-coding, and customized mappings of processes to workloads performed by manually moving a set of processes into a workload group.

Hard partitions or nPartitions (nPar) are implemented through hardware and can be defined as portions of a single server. Each instance of a hard partition (nPar) runs an operating system such as Hewlett-Packard Unix (HP-UX) independently of other nPars.

Virtual partitions or vPartitions (vPars) are created with software with each virtual partition running a separate instance of the operating system. Virtual partitions can be used within hard partitions (nPars).

Virtual Machines are partitions, much like virtual partitions, that are created with software and emulate generic servers, enabling sub-CPU and shared-I/O capabilities. Each Virtual Machine independently runs a separate operating system.

Resource partitions are partitions which are typically defined and managed through usage of a resource manager that manages resources such as processor sets (pSets) or Fair Share Scheduler (FSS) groups, or resources defined according to any suitable technology. Resource partitions can be used within, but not across, hard partitions, virtual partitions, and Virtual Machines. Resource partitions can run within a single instance of an operating system. The resource manager is a tool that enables control of allocation of central processing unit (CPU), private and shared memory, and storage (for example disk) bandwidth to multiple workloads or users within an operating system instance. The resource manager enables stacking of multiple applications within a single operating system instance and ensures that critical applications and users have access to system resources in a timely manner.

In an example of resource partition usage within a computer system, an operating system may have multiple concurrently running applications in an active state, for example including a database application and a web server. A resource manager can define resource partitions for each application to allocate resources to the particular application. For example, the database application may be allocated 40% of the resources, the web server also allocated 40%, and the remainder allocated to all other applications including overhead.

In some embodiments, an operating system kernel parameter set in the container can be tuned 312 according to workload template specifications.

Figure 3B:
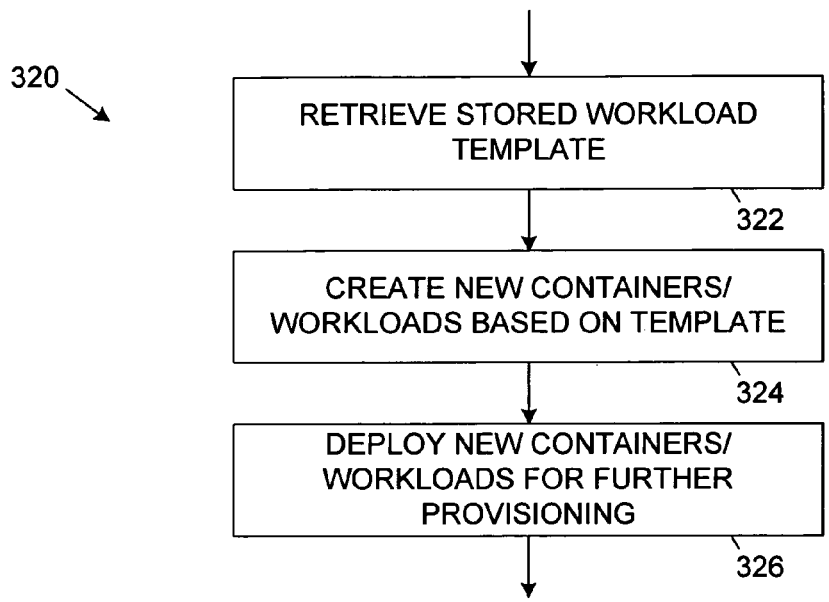

Referring to FIG. 3B, a flow chart shows an embodiment of a method for additional deployment 320 in of a stored template for provisioning of the original computer system or additional computers systems. The method 320 may comprise retrieving 322 the stored workload template and creating 324 new containers and/or workloads based on the workload template. The new containers and/or workloads are deployed 326 for further provisioning the original computer system or newly provisional other additional computer systems.

Figure 3C:
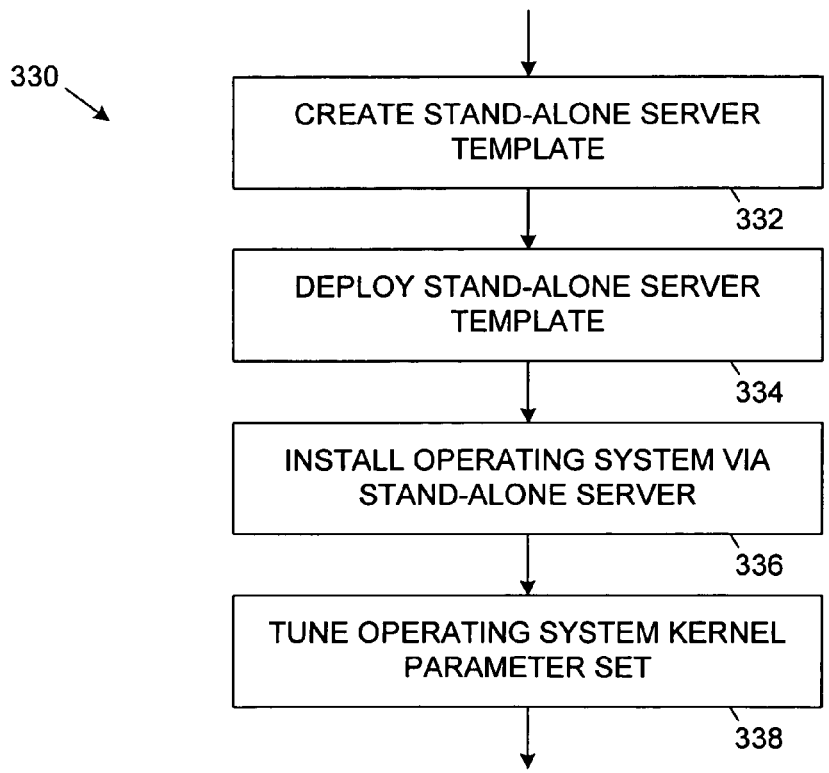

Referring to FIG. 3C, a flow chart illustrates another embodiment of a method 330 for provisioning a computer system. A user may operate the graphical user interface to create 332 a standalone server template. Typically, the user also deploys 334 the standalone server template to provision the computer system. Also the template may be stored without deployment, if desired. Upon deployment 334, the standalone server template installs 336 an operating system and tunes 338 an operating system kernel parameter set.

Figure 3D:
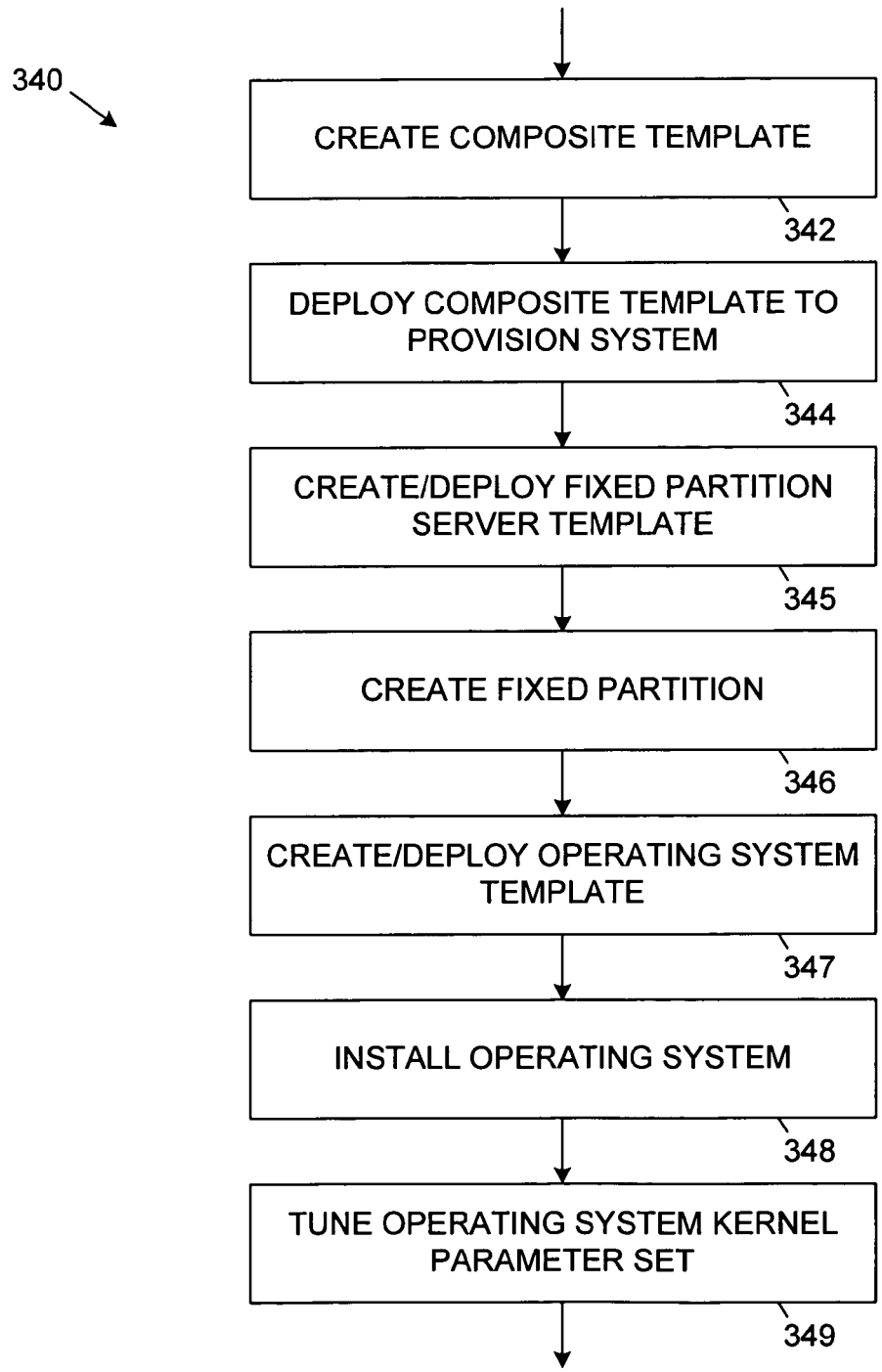

Referring to FIG. 3D, a flow chart illustrates an embodiment of a method 340 for provisioning a computer system using a composite template. A user may operate the graphical user interface to create 342 a composite template. Typically, the user also deploys 344 the composite template to provision the computer system. The template may otherwise be stored without deployment, if desired. Upon deployment 344, the composite template creates and/or deploys 345 a fixed partition (nPartition) server template which, upon deployment, creates 346 an nPartition. The composite template also creates and/or deploys 347 an operating system template which, upon deployment, installs 348 an operating system and tunes 349 an operating system kernel parameter set.

Figure 3E:
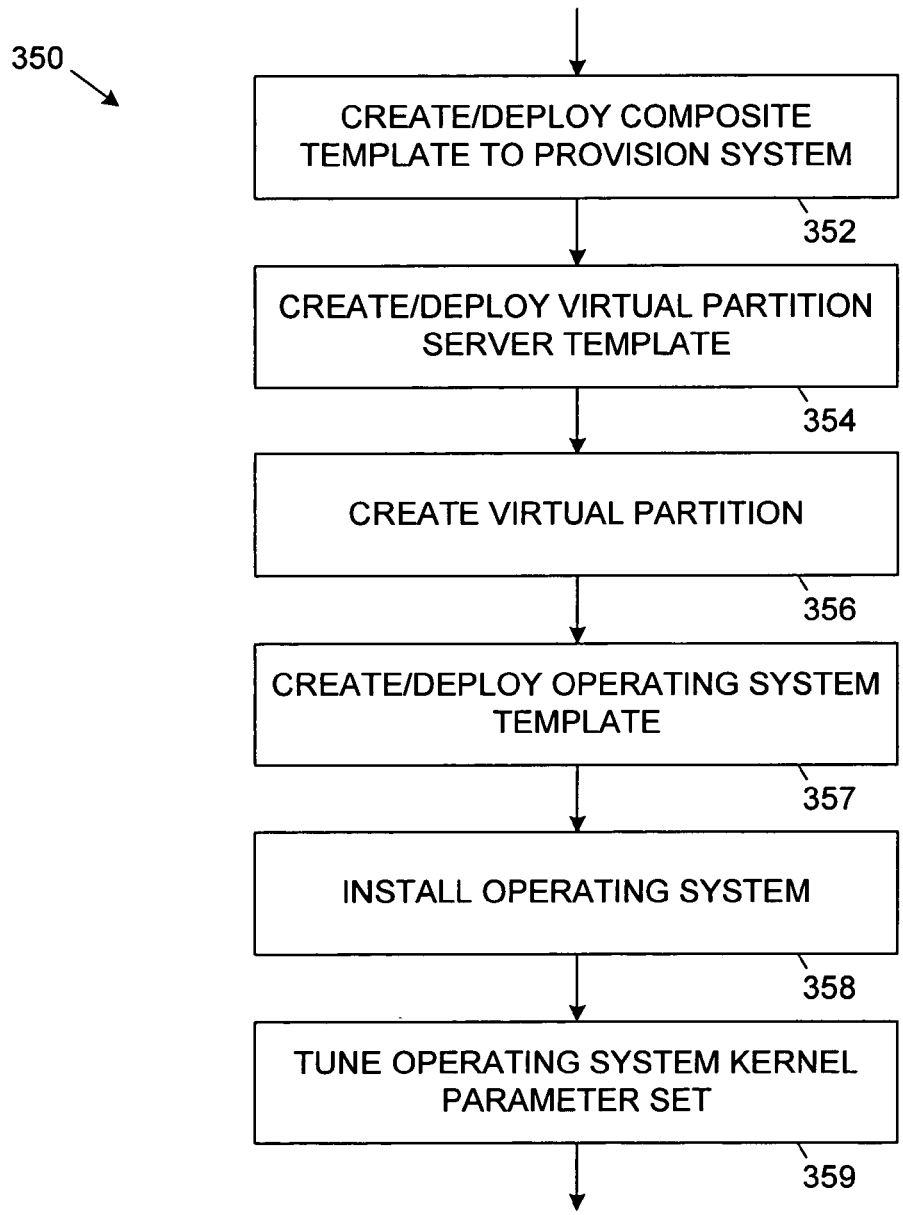

Referring to FIG. 3E, a flow chart illustrates another embodiment of a method 350 for provisioning a computer system using a composite template. A user may operate the graphical user interface to create and/or deploy 352 the composite template. Upon deployment, the composite template can create and/or deploy 354 a virtual partition (vPartition) server template which, upon deployment, creates 356 a vPartition. The composite template also creates and/or deploys 357 an operating system template which, upon deployment, installs 358 an operating system and tunes 359 an operating system kernel parameter set.

Figure 3F:
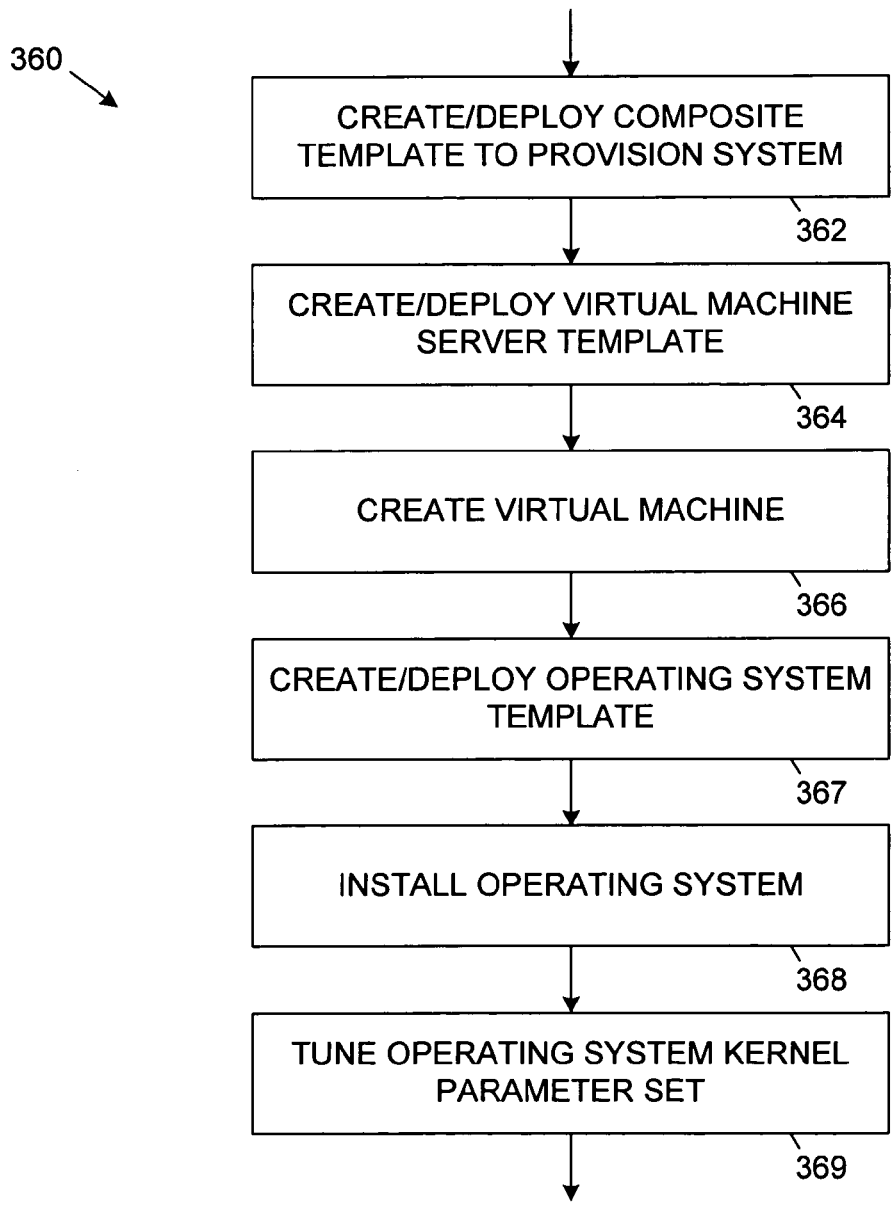

Referring to FIG. 3F, a flow chart illustrates another embodiment of a method 360 for provisioning a computer system using a composite template. A user may operate the graphical user interface to create and/or deploy 362 the composite template. Upon deployment, the composite template can create and/or deploy 364 a Virtual Machine server template which, upon deployment, creates 366 a Virtual Machine. The composite template also creates and/or deploys 367 an operating system template which, upon deployment, installs 368 an operating system and tunes 369 an operating system kernel parameter set.

Figure 3G:
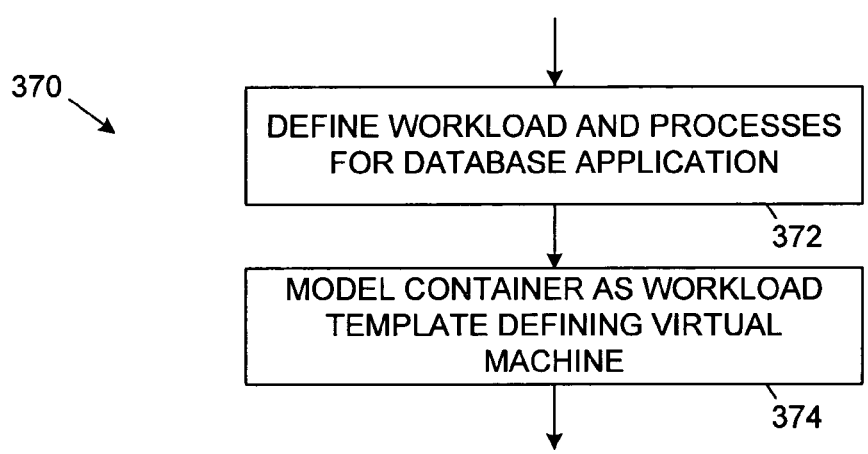

Referring to FIG. 3G, a flow chart shows an embodiment of a method 370 for provisioning a computer system configured to include one or more Virtual Machines. The method 370 further comprises defining 372 the workload to specify a set of processes that comprise a database application. The container can be modeled 374 as a workload template that defines a set of parameters sufficient to create a Virtual Machine.

Figure 3H:
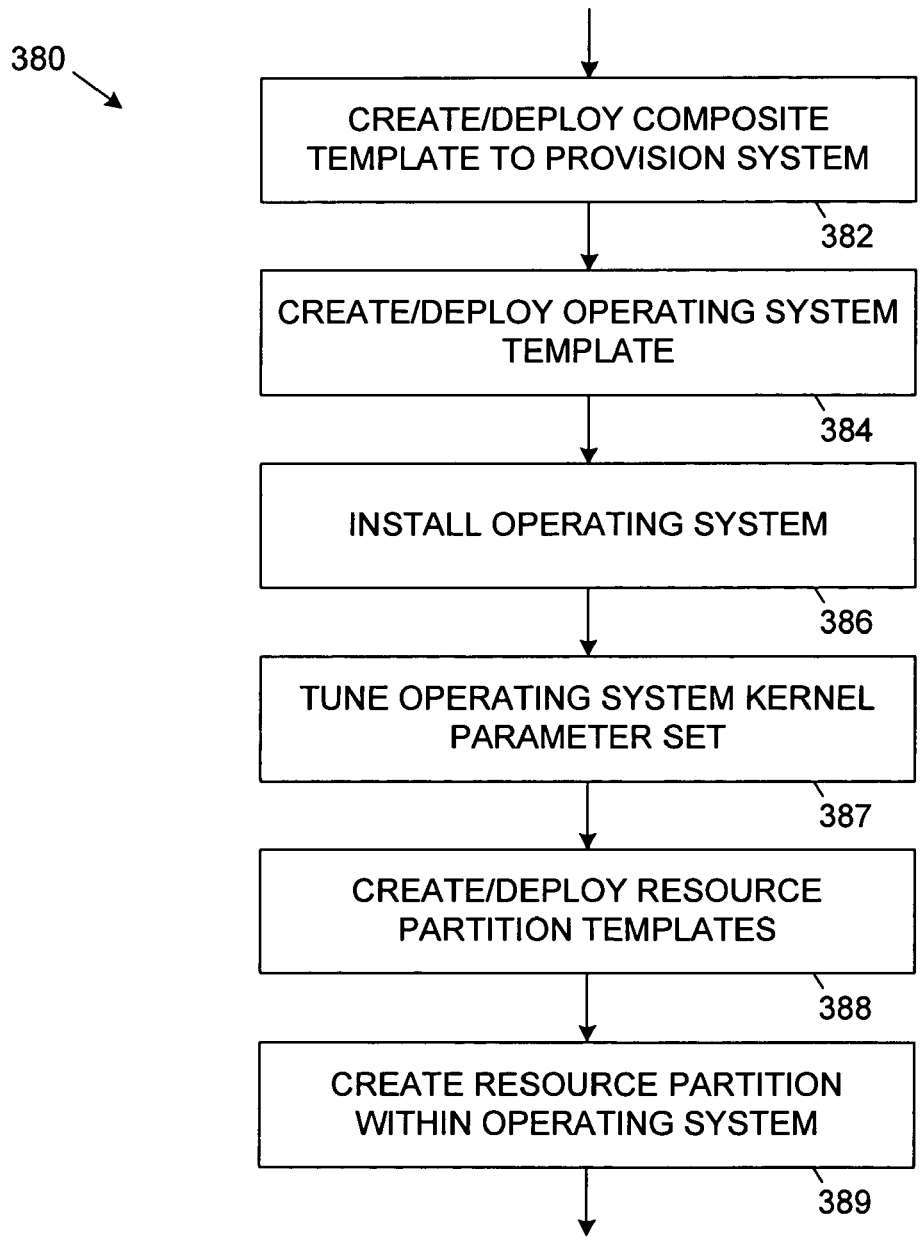

Referring to FIG. 3H, a flow chart illustrates another embodiment of a method 380 for provisioning a computer system using a composite template. A user may operate the graphical user interface to create and/or deploy 382 the composite template. Upon deployment, the composite template can create and/or deploy 384 an operating system template which, upon deployment, installs 386 an operating system and tunes 387 an operating system kernel parameter set. The composite template also creates and/or deploys 388 one or more resource partition template which, upon deployment, creates 389 a resource partition within the operating system.

Figure 4A:
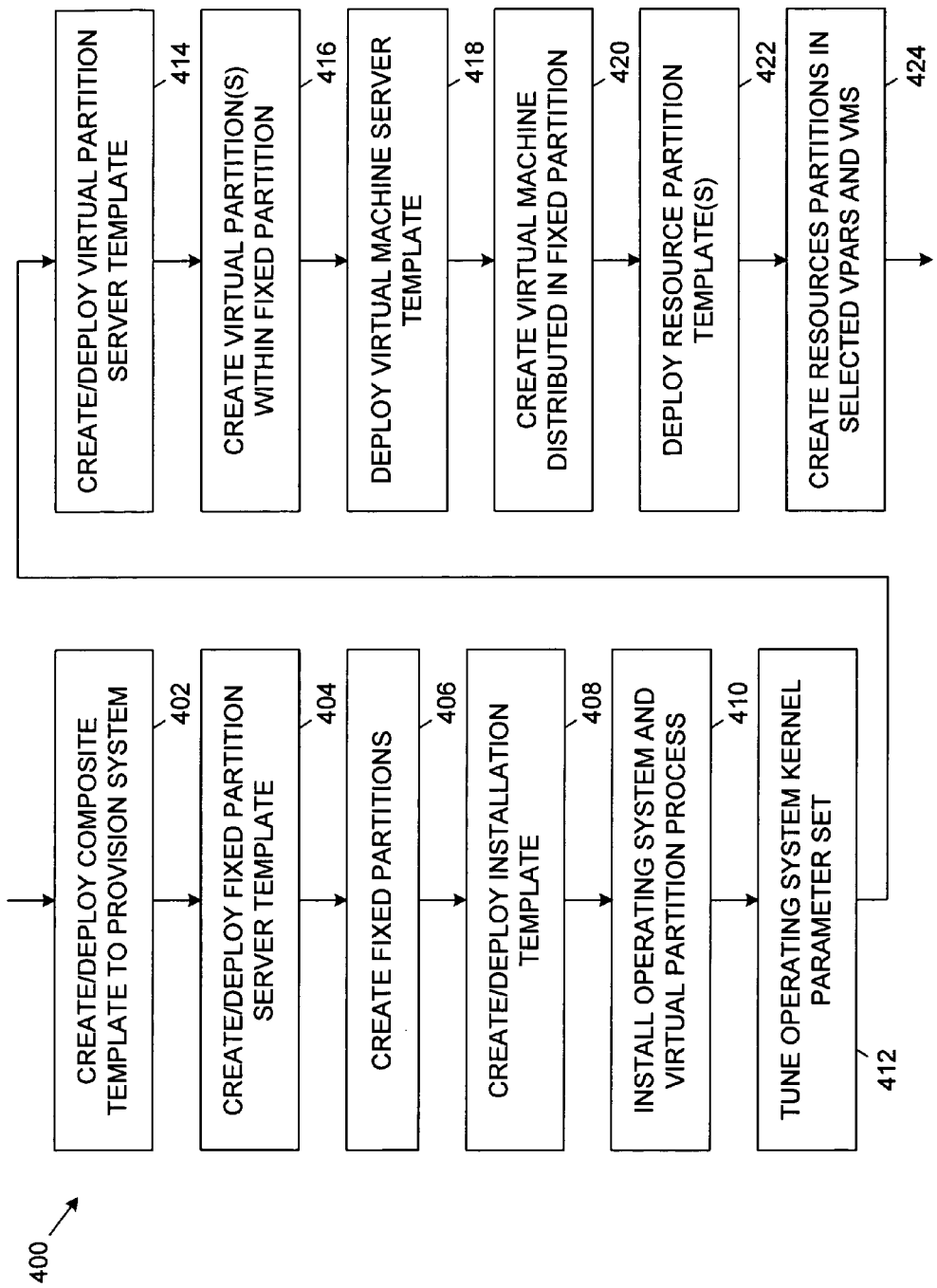
FIGS. 4A and 4B are flow charts showing embodiments of methods for provisioning a computer system using templates.

Referring to FIG. 4A, a flow chart depicts an embodiment of a method for provisioning 400 a computer system using templates. The graphical user interface enables a user to create and/or deploy 402 the composite template which, upon deployment, selects and deploys multiple component templates. In an illustrative example, the composite template can create and/or deploy 404 a fixed partition (nPartition) server template which, upon deployment, creates 406 at least one nPartition. The composite template further creates and/or deploys 408 an installation template which, upon deployment, installs 410 an operating system and a virtual partition process, and tunes 412 an operating system kernel parameter set. The composite template also creates and/or deploys 414 a virtual partition (vPartition) server template which, upon deployment, executes 416 the virtual partition process to create at least one vPartition distributed within the at least one nPartition. The composite template creates and/or deploys 418 a Virtual Machine server template which, upon deployment, creates 420 at least one Virtual Machine distributed within the at least one nPartition. The composite template also creates and/or deploys 422 one or more resource partition templates which, upon deployment, create 424 at least one resource partition within selected vPartitions and Virtual Machines.

A specific example illustrates how the templates can work in combination. A workload template, for example DBWorkload, can be defined to monitor a set of processes that make up a database. A container template, for example DB_VM_Container, can be defined that comprises a sufficient parameter set to create an appropriate Virtual Machine (VM). The parameters can be tuned according to specifications of the database, for example the number of processors for which a license is valid, a suitable amount of memory for running the database, the operating system type or types and version, and any appropriate kernel parameters. Once the parameters are tuned, a template can be created for a fixed partition (nPar) that functions as a Virtual Machine host, for example VM_HostContainer. The Virtual Machine host template typically includes parameters such as a number of processors and identifiers of various elements, for example input/output (I/O) chassis, operating system type and revision, and the like. Templates for all the partition and virtual machine elements can be combined in one composite template to provision a new overall system, for example a Superdome implementation. The composite template can be deployed to create at least one fixed partition (nPar) using VM_HostContainer, and once the VM_HostContainer is launched, deploy the DBWorkload template to monitor the database. The effect is that a new Superdome can progress from an unconfigured, out-of-the-box state, to running and monitoring a database on a Virtual Machine with one mouse clock ("One-click").

Figure 4B:
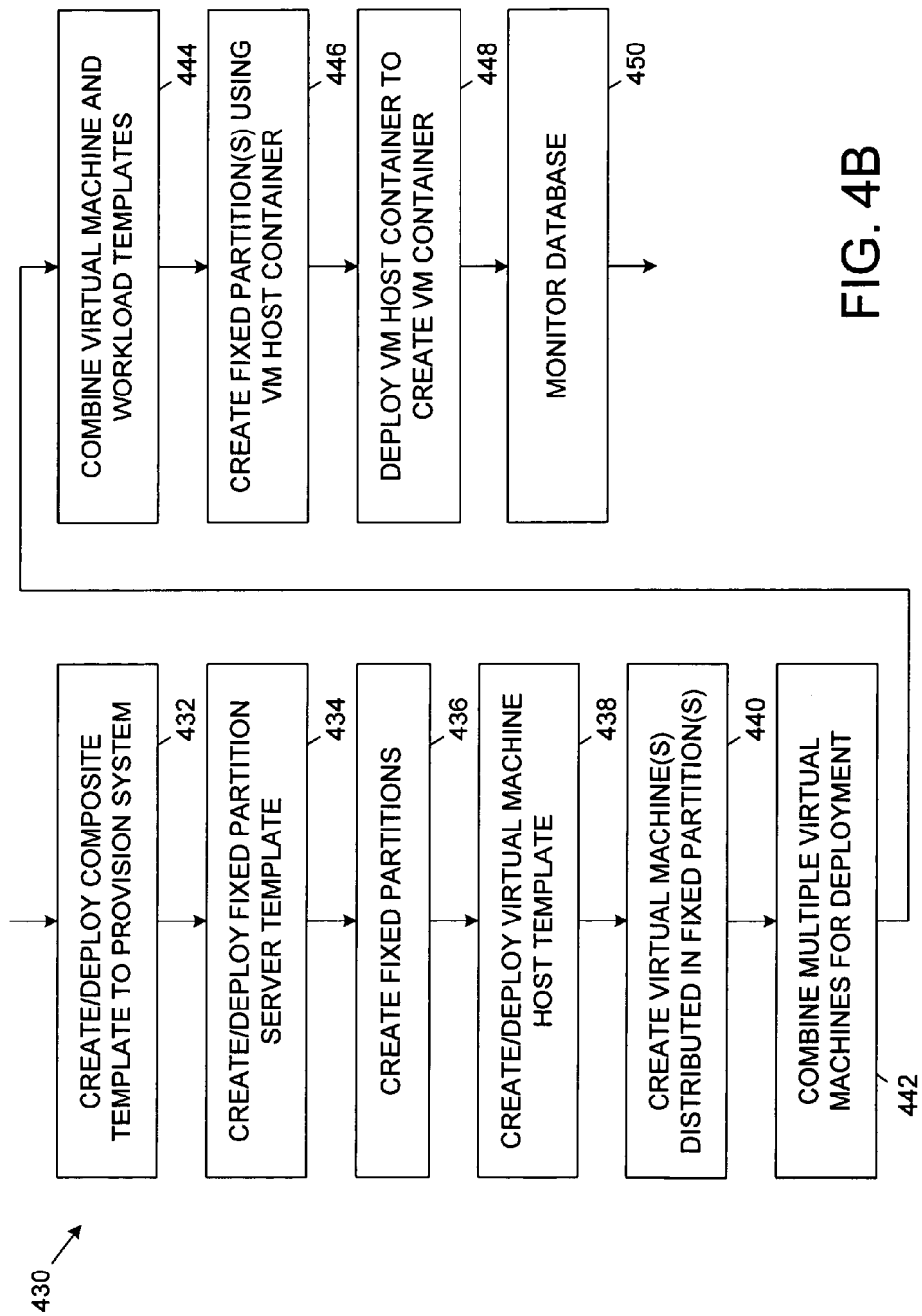

Referring to FIG. 4B, a flow chart depicts another embodiment of a method for provisioning 430 a computer system using templates. The graphical user interface enables a user to create and/or deploy 432 the composite template which, upon deployment, selects and deploys multiple component templates. In an illustrative example, the composite template can create and/or deploy 434 a fixed partition (nPartition) server template which, upon deployment, creates 436 at least one nPartition. The composite template can also create and/or deploy 438 a Virtual Machine host template which, upon deployment, creates at least one Virtual Machine 440 distributed within the nPartitions. Multiple Virtual Machine templates can be combined 442 for deployment after the nPartitions and Virtual Machines are successfully created. The Virtual Machine templates and the workload template can be combined 444 to form a system template. The composite template can further deploy 446 the system template to create at least one hard partition (nPartition) using a Virtual Machine host container and deploy 448 the Virtual Machine host container on the one or more Virtual Machines to create a Virtual Monitor container. The workload template can be deployed 450 to monitor a database.

Using templates simplifies deployment of entire systems which can include multiple technologies and operating systems. Templates enable users to unambiguously define specific known values while enabling more dynamic values to be entered when deployment occurs. At peak efficiency, one-click provisioning can be realized by appropriately constraining template parameters.

A computer system can implement a set of technologies that enable a range of partitioning methods. For example, a large computer system can be divided according to specifications of a user, system administrator, or other customer to create multiple smaller computer systems within the large system. Partitioning enables much flexibility in determining a system configuration. The configuration can take a hierarchical form with a highest level comprising hard partitions (nPars), for example a single nPar operating as a standalone system or multiple nPars within a single physical computer system. From the top level of the hierarchy, the fixed partition (nPar) or fixed partitions (nPars) can be divided into virtual partitions (vPars), a software implementation that enables further subdividing of computer system. As an alternative to virtual partitions (vPars), the next level of the hierarchy may include a different technology type, Virtual Machines (VMs). The individual nPars, vPars, and VMs can directly run an operating system, for example Hewlett-Packard Unix (HP-UX), Windows, Linux, or the like. The individual partitions enable a customer to run multiple distinct operating systems, each having different characteristics with respect to isolation, granularity, and several different tradeoffs for selection by the customer.

Templates can be used to enable flexible configuration of the computer system according to selection of various elements, for example elements such as fixed partitions, virtual partitions, virtual machines, resource partitions, and selection and configuration of resources within the various partition types.

Figure 5A:
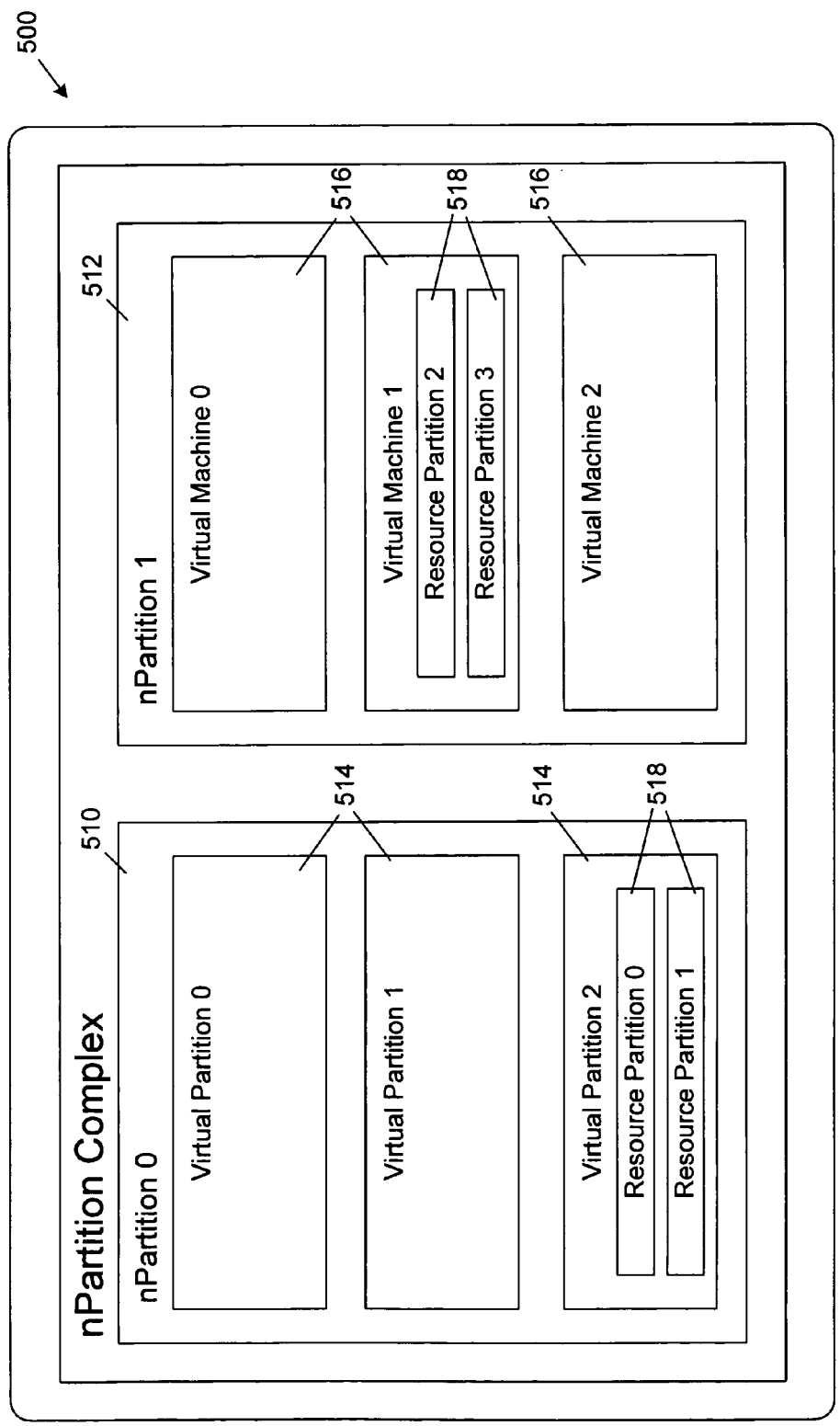
FIGS. 5A through 5C are graphical block diagrams depicting an example embodiment of a system configuration.
Figure 5B:
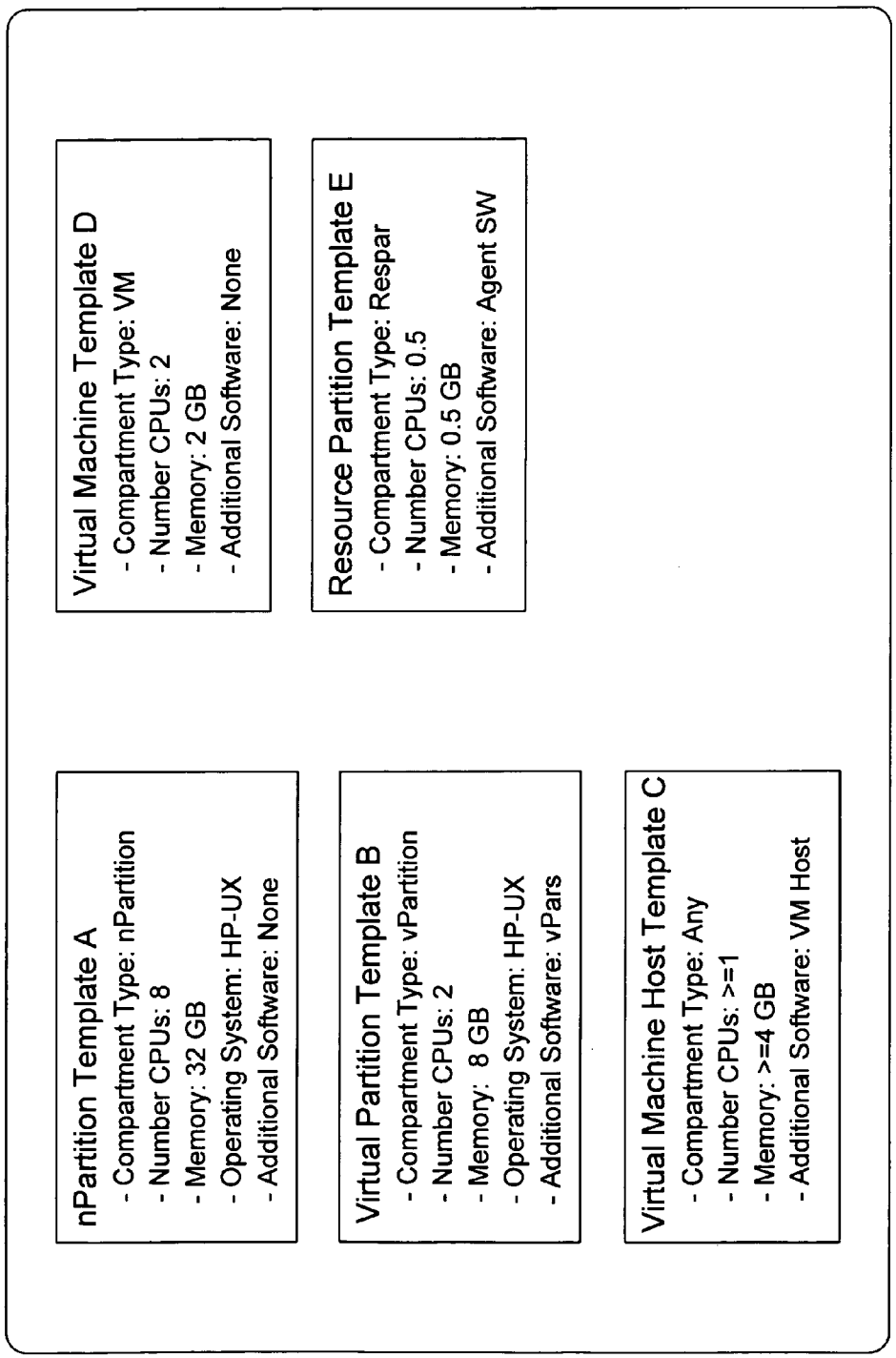
Figure 5C:
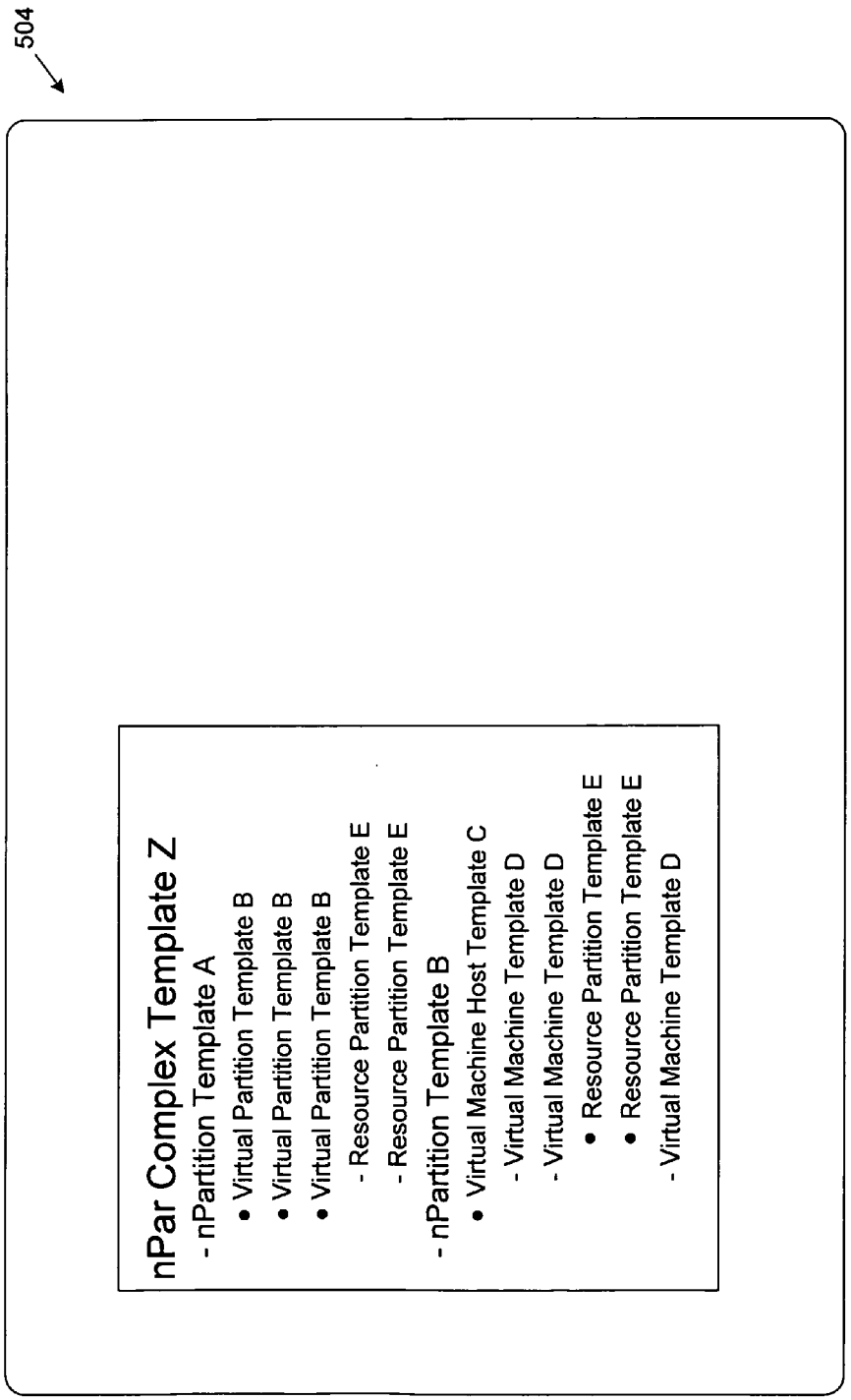

Referring to FIGS. 5A through 5C, several graphical block diagrams depict an example embodiment of a system configuration 500. An initial blank system has no partitions or other configuration settings. A system configuration 500 shown in FIG. 5A can be constructed from simple templates 502 depicted in FIG. 5B and a composite template 504 illustrated in FIG. 5C. Using the simple templates 502, the composite template 504 can be used to define the entire configuration 500 of a server.

The simple templates 502 are typically configured as highly re-usable components. Complex templates 504 can also be re-usable although often have a degree of complexity that limits re-use in practice.

In a user interface, the composite template 504 can be dragged and dropped onto a blank system. A programmed application or software engine can perform multiple steps to create the system 500 for deployment. In an illustrative example, the steps may include creating two fixed partitions (nPars) 510 and 512, and installing an operating system such as Hewlett-Packard Unix (HP-UX) on the fixed partitions (nPars) 510 and 512 in parallel. Virtual partition (vPar) software can be installed on fixed partition 0 (nPar0) 510 and Virtual Machine software installed on fixed partition 1 (nPar1) 512 in parallel. The steps can further include creating virtual partitions 0-2 (vPars 0-2) 514 and Virtual Machines 0-2 (VMs 0-2) 516 in parallel, and installing the operating system HP-UX on the virtual partitions (vPars) 514 and the Virtual Machines (VMs) 516 in parallel. Agent software can also be installed on selected elements, for example virtual partition 2 (vPar 2) and Virtual Machine 1 (VM1) in parallel. Resource partitions 518 can also be created in parallel. The system administrator, user, or other customer may use the templates to freely select a configuration of partitions, resources, and operational parameters, as desired.

Templates can also be used to combine multiple servers into an entity called a cluster. The servers or nodes of a cluster are typically loosely-connected, each maintaining separate processors, memory, and operating systems. Special communication protocols and system processors connect the nodes and enable mutual cooperation, facilitating availability and support for mission-critical applications. Cluster configurations enable a cost-effective, flexible architecture for supporting demanding information technology infrastructures.

The illustrative structures, systems, and operating methods enable definition of a template to describe a system. Usage of templates promotes efficiency because a customer may order a system and intend to create multiple identical systems, or systems with minor variations. Templates enable configuration of a system to match other systems in an environment. Systems can be duplicated while avoiding sequencing through multiple steps in a tedious manual process. Template usage avoids errors made in attempting to create duplicate systems due to inadvertent entry errors.

The templates also enable combination of templates into a composite form. Some subsets of an overall system may be created and deployed through usage of individual templates used in combination. For example, some systems may include multiple virtual partitions, each of which is created in an identical or similar configuration. For example, the virtual partitions may all be created in a similar configuration with a selected number of CPUs, a specified amount of memory, and a set of input/output configurations. Virtual partitions that are identical can be created using a single template. Virtual partitions with some variations can be created using a template that is modified from the single common template.

In a particular example, a composite template can be used to create virtual partitions, one of which is created to run a database server and another created to run a web server. Resource partitions can be particularly configured independently for the database virtual partition and for the web server virtual partition. Composite templates enable flexible mixing and matching of resources according to applications that run in the virtual partitions.

The templates can specify resource partitions, for example according to application. For example, a template for database creation can define resource partitions with a set amount of resources and a template designed for web server creation can define resource partitions with a different resource set.

Templates for creating and/or deploying virtual machines can select from among different varieties of operating systems, such as HP-UX, Windows, and Linux, and/or may have a different set of installed applications.

Templates can be configured to dynamically allocate resources based on system demands. Part of template can also specify a policy to control resource allocation based on demand.

The various functions, processes, methods, and operations performed or executed by the system can be implemented as programs that are executable on various types of processors, controllers, central processing units, microprocessors, digital signal processors, state machines, programmable logic arrays, and the like. The programs can be stored on any computer-readable medium for use by or in connection with any computer-related system or method. A computer-readable medium is an electronic, magnetic, optical, or other physical device or means that can contain or store a computer program for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A method comprising:
deploying, using a computer system, a first version of a composite template including a container template and a workload template to a first computer system so as to
  create plural containers within said computer system,
  deploy said container template so as to configure a first container of said plural containers, and
  deploy said workload template so as to install and configure a first workload in said first container; and
deploying a second version of said composite template to a second computer system separate from said first computer system, said second version being the same as said first version or being obtained by modifying said first version.

2. A method as recited in claim 1 further comprising:
modifying said first version to yield a third version of said composite template different from said first version; and
after deploying said first version to said first computer system, deploying said third version to said first computer system.

3. A method as recited in claim 1 wherein said first container is one of plural nested containers within said first computer system.

4. A method as recited in claim 1 wherein said first container defines an operating system environment and said first workload includes an operating system.

5. A method as recited in claim 1 further comprising creating said first version so that it includes said container template and said workload template.

6. A method as recited in claim 1 wherein said first container is of a type selected from a set consisting of hard partitions, virtual partitions, virtual machines, and resource partitions.

7. A system comprising non-transitory tangible computer-readable storage media encoded with code configured to, when executed by a processor,
create a first version of a composite template so that it includes a first container template and a first workload template;
modify said first version to yield a second version of said composite template including a second container template and a second workload template; and
deploy said first and second versions to respective first and second computer systems so as to, for each of said first and second computer systems,
  create plural containers within the respective computer system,
  deploy the respective container template so as to configure a respective first container of the respective plural containers, and
  deploy the respective workload template so as to install and configure a respective workload in said respective first container.

8. A system as recited in claim 7 further comprising said processor.

9. A system as recited in claim 7 wherein said first and second computer systems are the same computer system.

10. A system as recited in claim 7 wherein said first and second computer systems are separate.

11. A system as recited in claim 7 wherein said code is configured to deploy said first version to a third computer system different from said first computer system.

* * * * *